US006628332B1

(12) United States Patent
Watanabe

(10) Patent No.: US 6,628,332 B1
(45) Date of Patent: Sep. 30, 2003

(54) INTERLINE TRANSFER TYPE IMAGING DEVICE SUITABLE FOR PRODUCING HIGH RESOLUTION STILL IMAGES

(75) Inventor: Takashi Watanabe, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/382,750

(22) Filed: Aug. 25, 1999

(30) Foreign Application Priority Data

Aug. 26, 1998 (JP) .......................................... 10-239866

(51) Int. Cl.[7] .............................. H04N 3/14; H04N 5/335
(52) U.S. Cl. ..................... 348/322; 348/316; 348/320; 348/298; 257/222; 257/232
(58) Field of Search ................................ 348/294, 297, 348/298, 311, 312, 315–317, 319–324; 257/222, 223, 229, 232, 233, 291, 292; H04N 3/14, 5/335

(56) References Cited

U.S. PATENT DOCUMENTS

| | | | | |
|---|---|---|---|---|
| 5,546,127 A | * | 8/1996 | Yamashita | .................. 348/322 |
| 5,572,256 A | * | 11/1996 | Egawa | ....................... 348/312 |
| 5,990,952 A | * | 11/1999 | Hamasaki | ................... 348/311 |
| 6,141,049 A | * | 10/2000 | Harada | ...................... 348/296 |
| 6,388,278 B1 | * | 5/2002 | Suzuki | ....................... 257/222 |
| 6,429,898 B1 | * | 8/2002 | Shoda | ....................... 348/316 |

* cited by examiner

*Primary Examiner*—Ngoc-Yen Vu
(74) *Attorney, Agent, or Firm*—Edwards & Angell; David G. Conlin

(57) ABSTRACT

An interline transfer type solid imaging device includes a first photosensitive section, a second photosensitive section, and a vertical transfer section. The interline transfer type solid imaging device reads an image signal corresponding to a first field from the first photosensitive section, and reads an image signal corresponding to a second field from the second photosensitive section. First signal charges stored in the first photosensitive section are read into the vertical transfer section. A portion of second signal charges stored in the second photosensitive section are shifted into the first photosensitive section.

8 Claims, 10 Drawing Sheets

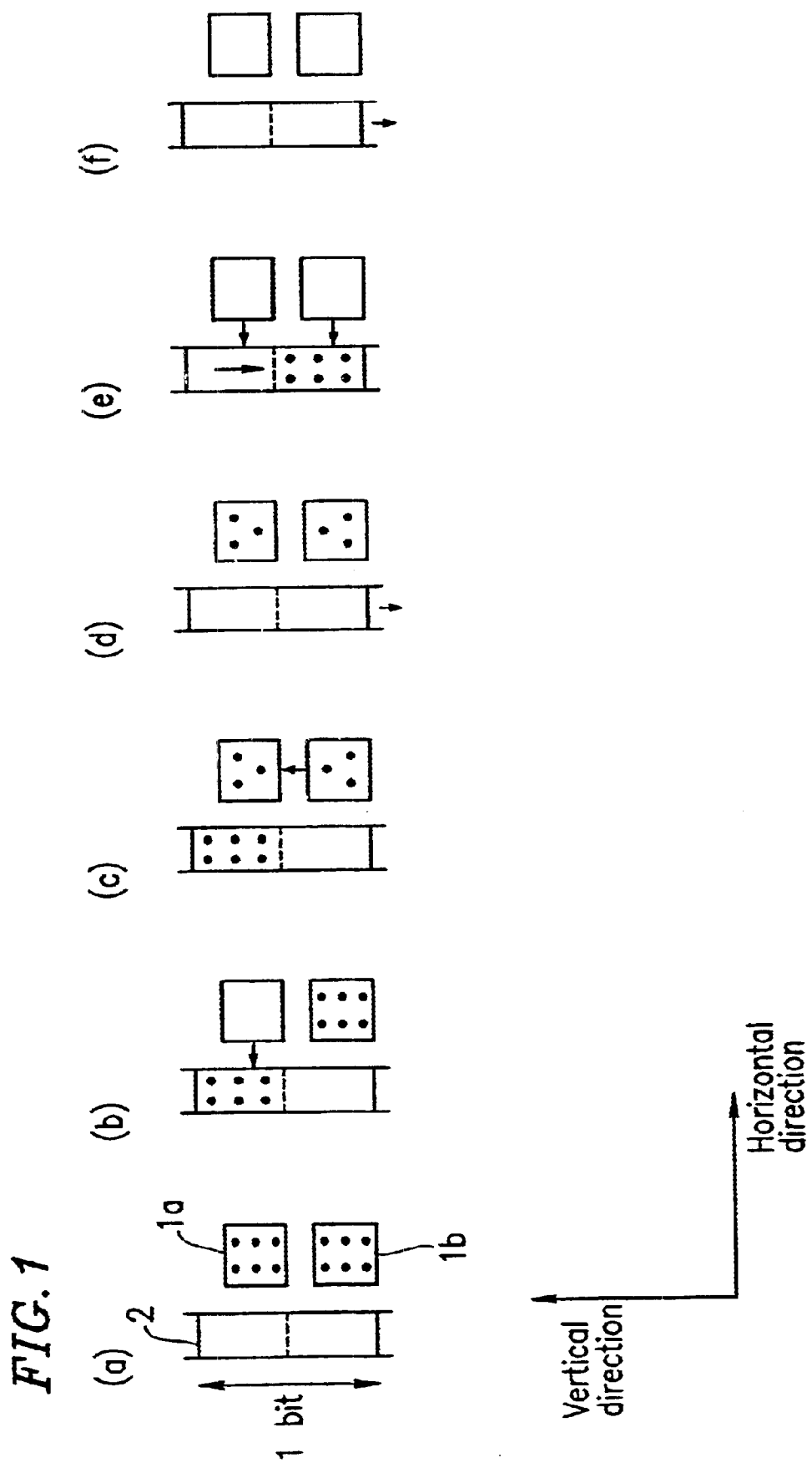

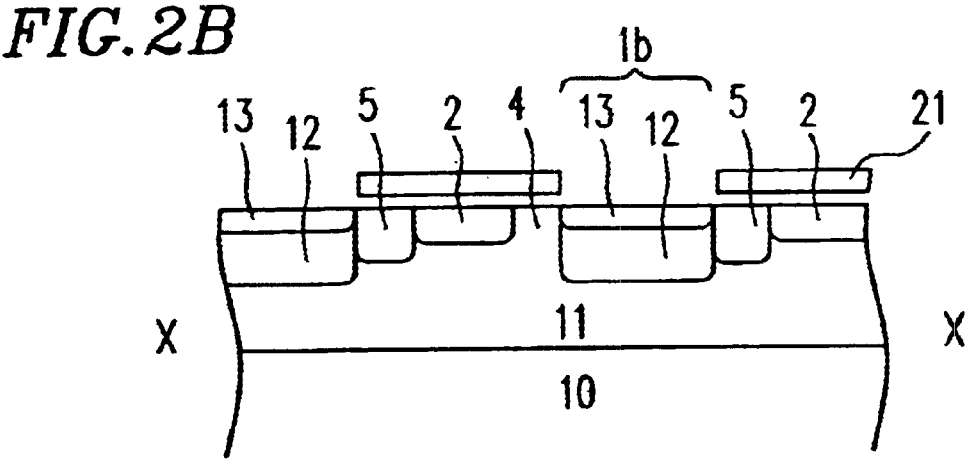
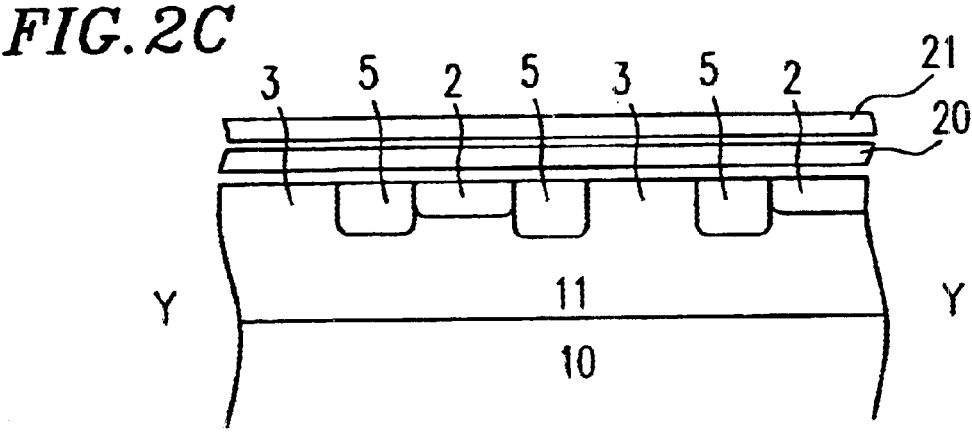
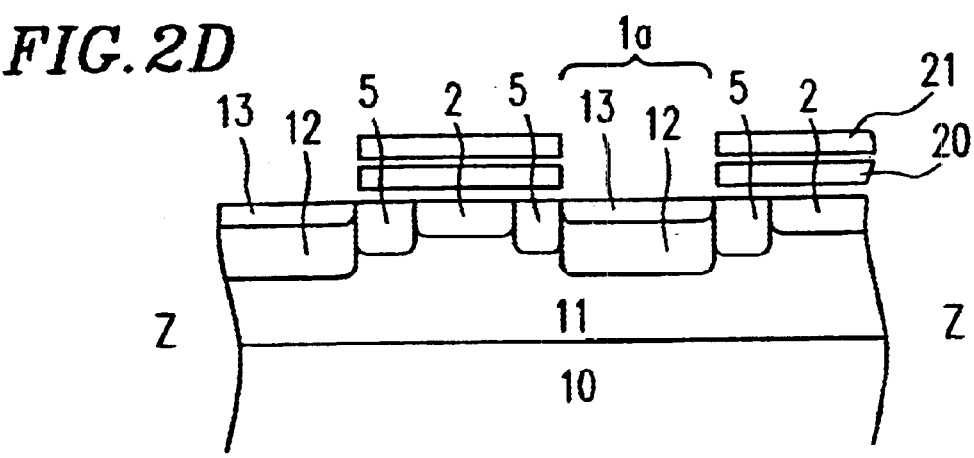

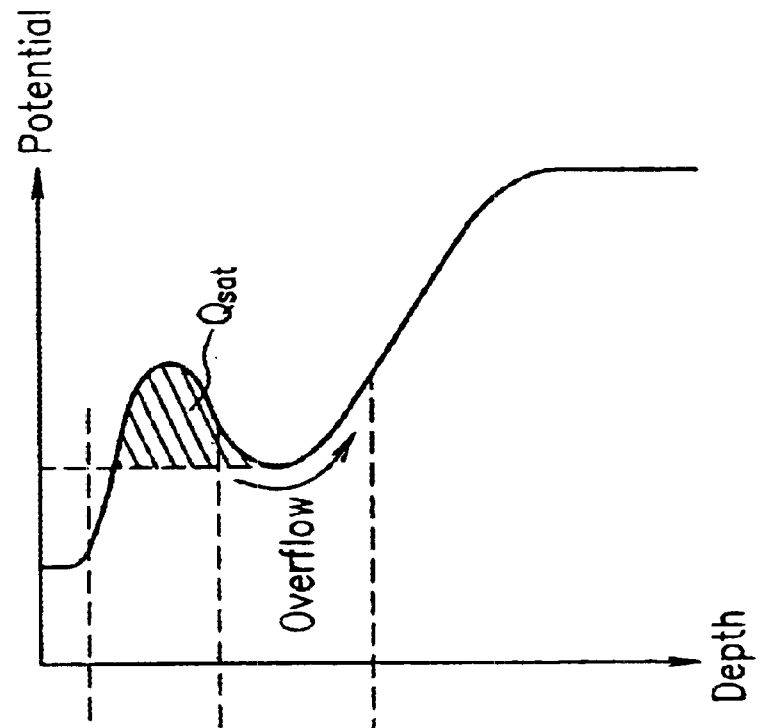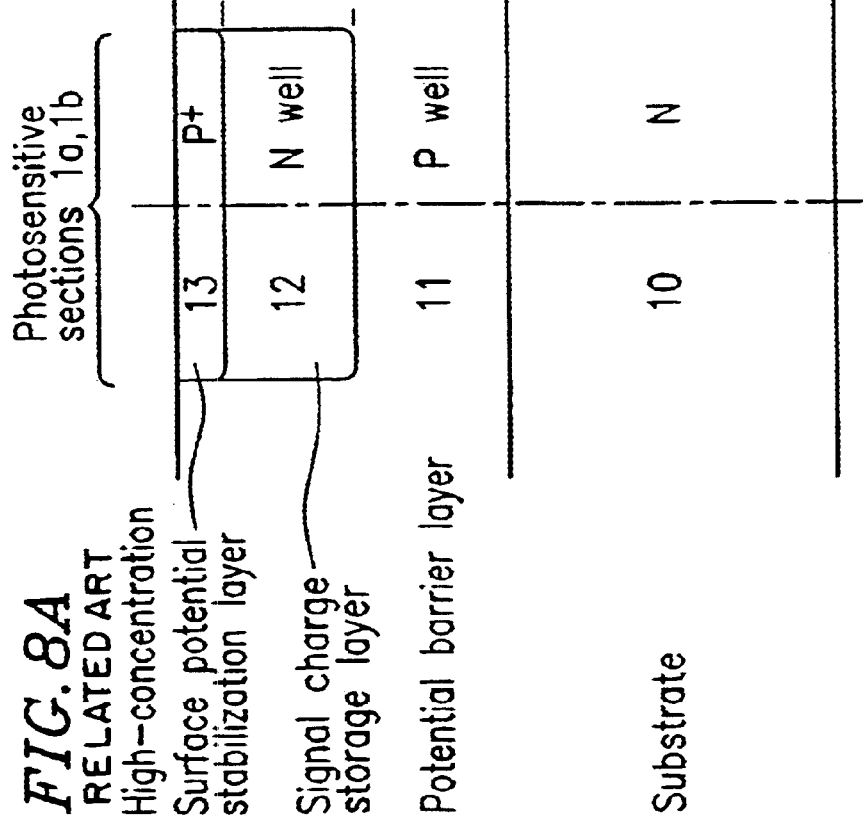

INTERLINE TRANSFER TYPE IMAGING DEVICE SUITABLE FOR PRODUCING HIGH RESOLUTION STILL IMAGES

BACKGROUND OF THE INVENTION

1. Field of the Invention

The present invention relates to a solid imaging device incorporating charge coupled devices (CCD) or the like. In particular, the present invention relates to a solid imaging device of an interline transfer type suitable for the imaging of still images.

2. Description of the Related Art

Methods for obtaining high-resolution still images are generally known which employ an interline transfer type solid imaging device (e.g., a CCD) in combination with an optical shutter.

FIG. 5 is a schematic diagram illustrating two adjoining pixels 1a and 1b and a vertical transfer section 2 of a conventional interline transfer type solid imaging device. Specifically, FIG. 5 shows chronologically-occurring states ((a) to (e)) of the pixels 1a and 1b. The dots in FIG. 5 represent signal charges.

It is assumed that the pixel 1a constitutes a $(2n-1)^{th}$ (or "odd-numbered") photosensitive section and that the pixel 1b constitutes a $(2n)^{th}$ (or "even-numbered") photosensitive section, where n is a natural number. The information in the odd-numbered photosensitive section 1a and the information in the even-numbered photosensitive section 1b together correspond to one bit in the vertical transfer section 2.

State (a) represents a state immediately after an optical shutter (not shown) has been shut following a period for obtaining sufficient exposure. It is assumed that the optical shutter remains shut throughout states (a) to (e).

In state (a), the photosensitive sections 1a and 1b store signal charges. In state (b), the signal charges in the odd-numbered photosensitive section 1a are all read into the vertical transfer section 2. In state (c), the signal charges which have been read into the vertical transfer section 2 are sequentially read to the outside, thereby providing a first field image signal corresponding to the odd-numbered photosensitive section 1a.

Next, in state (d), the signal charges in the remaining even-numbered photosensitive section 1b are all read into the vertical transfer section 2. In state (e), the signal charges which have been read into the vertical transfer section 2 are sequentially read to the outside, thereby providing a second field image signal corresponding to the even-numbered photosensitive section 1b.

FIG. 6 illustrates a plane pattern implementing the conventional photosensitive sections 1a and 1b and the vertical transfer section 2 schematically shown in FIG. 5.

In FIG. 6, broken lines depict lower electrodes 20; solid lines depict upper electrodes 21; a hatched portion represents a channel interruption region 5; and a dotted portion represents a surface channel region 4. In FIG. 6, the component elements which also appear in FIG. 5 are denoted by the same reference numerals as used therein.

The photosensitive sections 1a and 1b are formed on a low-concentration P layer. In general, the photosensitive sections 1a and 1b (PD) are implemented by using an embedded photodiode structure. The surface of the photosensitive sections 1a and 1b is a high-concentration P$^+$ layer (FIG. 8A). The underlying one of the photosensitive sections 1a and 1b is an N layer (storage layer) for storing signal charges (electrons). The N storage layer is formed on the low-concentration P layer. The structure of the photosensitive sections 1a and 1b along the depth direction will be described in greater detail below with reference to FIG. 8B.

In general, the vertical transfer section 2 (VCCD) is implemented as an embedded channel composed essentially of an N surface layer overlying the low-concentration P layer. Clock signals $\phi_{v2}$ and $\phi_{v4}$ are applied to the lower electrodes 20. Clock signals $\phi_{v1}$ and $\phi_{v3}$ are applied to the upper electrodes 21.

FIG. 7 illustrates an operation of the interline transfer type solid imaging device shown in FIG. 6.

At time $t_0$, an optical shutter (not shown) is shut after a period for obtaining sufficient exposure, corresponding to state (a) in FIG. 5.

During period $t_1$, the vertical transfer section 2 is driven at a high speed so as to drain unnecessary charges within the vertical transfer section 2. At time $t_2$, the signal charges in the odd-numbered photosensitive section 1a are read into the vertical transfer section 2, corresponding to state (b) in FIG. 5.

During period $t_4$, the vertical transfer section 2 is driven at a normal speed so that the signal charges within the vertical transfer section 2 are read to the outside to give a first field image signal corresponding to the odd-numbered photosensitive section 1a, corresponding to state (c) in FIG. 5.

Next, at time $t_5$, the signal charges in the even-numbered photosensitive section 1b are read into the vertical transfer section 2, corresponding to state (d) in FIG. 5.

Finally, during period $t_7$, the vertical transfer section 2 is driven at a normal speed so that the signal charges within the vertical transfer section 2 are read to the outside to give a second field image signal corresponding to the even-numbered photosensitive section 1b, corresponding to state (e) in FIG. 5.

In recent years, a vertical overflow drain structure is generally adopted for the photosensitive sections 1a and 1b.

FIG. 8A shows an exemplary vertical overflow drain structure. The vertical overflow drain structure shown in FIG. 8A includes a surface potential stabilization layer (high-concentration P$^+$ layer) 13, a signal charge storage layer (N layer) 12, a potential barrier layer (low-concentration P layer) 11, and a substrate (low-concentration N layer) 10 underlying the potential barrier layer 11.

FIG. 8B is a graph illustrating a potential distribution of the vertical overflow drain structure shown in FIG. 8A.

As shown in FIG. 8B, if a large amount of signal charges are generated under excessive light and flow into the signal charge storage layer 12, a portion which cannot be stored in the layer 12 may overflow into the substrate 10. This is because the substrate 10 functions as a drain with respect to the signal charges so that the low-concentration P layer 11 forms a potential barrier. As a result, the signal charges will be stored up to a certain saturation value $Q_{sat}$ (defined below), past which the signal charges will be drained to the substrate 10.

The following problems may arise when the above-described vertical overflow drain structure is combined with an optical shutter.

For the sake of illustration, it is assumed that an amount ($Q_{sat}$) of signal charges are stored in the signal charge storage layer 12 at time $t_0$ in FIG. 7 (i.e., immediately after the optical shutter has been shut). The amount $Q_{sat}$ defines the saturation level, or the upper limit, of the amount of signal charges which can be stored in the signal charge storage layer 12.

Since no signal charges are generated in the photosensitive sections 1a and 1b between time to and the next time the shutter is opened, the saturation level $Q_{sat}$ of signal charges continuously decreases due to heat emission effects. This relationship between the saturation level $Q_{sat}$ and lapse of time can be expressed as follows (C. H. Sequin and M. F. Tompsett, translated by Takeishi and Kayama, "CHARGE TRANSFER DEVICES ", p.85, Kindai Kagakusha 1978):

$$Q(t)=Q_0-C \cdot kT \cdot In[1+(t-t_0)/\tau]  \quad \text{eq. 1}$$

In eq. 1, t and $t_0$ represent points in time; C represents the capacity of the charge storage layer; k represents the Boltzmann constant; T represents absolute temperature; and τ represents a time constant which is determined in accordance with the structure of the charge storage layer.

The following values are illustrative of actual measurements that may be obtained in connection with the relationship shown in eq. 1:

$$C \cdot kT/Q_0 \approx 0.05, (t-t_0)/\tau \approx 1 \text{ to } 500 \quad \text{eq. 2}$$

Accordingly, $Q(t)/Q_0 \approx 0$ to 0.3, indicating that $Q(t)$ may be decreased by about 70% of the initial value.

FIG. 9 is a graph depicting the relationship of eq. 1. In accordance with the operation illustrated in FIG. 7, the $Q_{sat}$ level of the first field corresponding to the odd-numbered photosensitive section 1a is shown at $Q_a$ in the graph of FIG. 9 (assuming $t_2-t_0=T_a$). The $Q_{sat}$ level of the second field corresponding to the even-numbered photosensitive section 1b is shown at $Q_b$ in the graph of FIG. 9 (assuming $t_5-t_0=T_b$). Since $T_b>T_a$, it will be seen that the saturation signal for the second field is greatly reduced.

In order to obtain a high-resolution still image, it is necessary to construct a high-resolution still image, from two image signals, i.e., a first field and a second field. If the two signals have a large difference in saturation level, the saturation level for the entire image will be bottlenecked by the lower saturation level. This may result in a reduced dynamic range, which is a significant problem.

SUMMARY OF THE INVENTION

An interline transfer type solid imaging device according to the present invention includes a first photosensitive section, a second photosensitive section, and a vertical transfer section, the interline transfer type solid imaging device reading an image signal corresponding to a first field from the first photosensitive section and reading an image signal corresponding to a second field from the second photosensitive section. The interline transfer type solid imaging device operates as follows: (i) after effecting exposure for a predetermined period of time, light is shielded from entering the first and second photosensitive sections; (ii) first signal charges stored in the first photosensitive section are read into the vertical transfer section; (iii) a portion of second signal charges stored in the second photosensitive section are shifted into the first photosensitive section; (iv) the first signal charges in the vertical transfer section are read during a transfer operation; (v) the signal charges stored in the second photosensitive section and the signal charges stored in the first photosensitive section are read into the vertical transfer section, and added within the vertical transfer section so that the second signal charges are reproduced; and (vi) the reproduced second signal charges are read during a transfer operation.

In one embodiment of the invention, the first photosensitive section and the second photosensitive section each includes a signal charge storage layer, a substrate, and a potential barrier layer formed between the signal charge storage layer and the substrate, and the first photosensitive section and the second photosensitive section each have a vertical overflow drain structure for draining excessive signal charges stored in the signal charge storage layer to the substrate.

In another embodiment of the invention, the first photosensitive section and the second photosensitive section each include a high-concentration surface potential stabilization layer upon the signal charge storage layer, the potential stabilization layer having the opposite conductivity type from that of the signal charge storage layer.

In still another embodiment of the invention, a channel for transferring signal charges is provided between the second photosensitive section and the first photosensitive section.

In still another embodiment of the invention, the interline transfer type solid imaging device further includes: a lower electrode layer formed so as to extend between the first photosensitive section and the second photosensitive section; a channel region underlying the lower electrode layer for transferring signal charges between the first photosensitive section and the second photosensitive section; and a channel interruption layer formed so as to extend between at least a portion of the first and second photosensitive sections and the vertical transfer section, wherein a portion of the lower electrode layer covers a portion of the vertical transfer section.

In still another embodiment of the invention, the shifting of the port ion of the second signal charges from the second photosensitive section to the first photosensitive section is achieved by applying a read signal to the lower electrode layer.

In still another embodiment of the invention, the interline transfer type solid imaging device further includes: an upper electrode layer formed so as to cover a portion between the first photosensitive section and the first vertical transfer section, the portion between the second photosensitive section and the vertical transfer section, as well as a portion of the vertical transfer section, a channel region formed so as to extend between the first and second photosensitive sections and the vertical transfer section, under the upper electrode layer, a further vertical transfer section formed in a vicinity of the first and second photosensitive sections, and a further channel interruption layer formed between the further vertical transfer section and the first and second photosensitive sections.

In still another embodiment of the invention, the reading of the signal charges from the first and second photosensitive section into the vertical transfer section is achieved by applying a read signal to the upper electrode layer.

Thus, the invention described herein makes possible the advantage of providing a method and a structure for obtaining a high-resolution image signal by employing an interline transfer type solid imaging device in combination with an optical shutter, where the saturation level for a second field is prevented from lowering relative to the saturation level for a first field.

This and other advantages of the present invention will become apparent to those skilled in the art upon reading and understanding the following detailed description with reference to the accompanying figures.

BRIEF DESCRIPTION OF THE DRAWINGS

FIG. 1 is a schematic diagram illustrating two adjoining pixels 1a and 1b and a vertical transfer section 2 of an interline transfer type solid imaging device according to one example of the present invention, illustrating chronologically-occurring states ((a) to (f)) of the pixels 1a and 1b.

FIG. 2B is a cross-sectional view illustrating the interline transfer type solid imaging device in FIG. 2A taken at line X—X.

FIG. 2C is a cross-sectional view illustrating the interline transfer type solid imaging device in FIG. 2A taken at line Y—Y.

FIG. 2D is a cross-sectional view illustrating the interline transfer type solid imaging device in FIG. 2A taken at line Z—Z.

FIG. 8A shows an exemplary vertical overflow drain structure.

FIG. 8B is a graph illustrating a potential distribution of the vertical overflow drain structure shown in FIG. 8A.

DESCRIPTION OF THE PREFERRED EMBODIMENTS

Figure 2A:
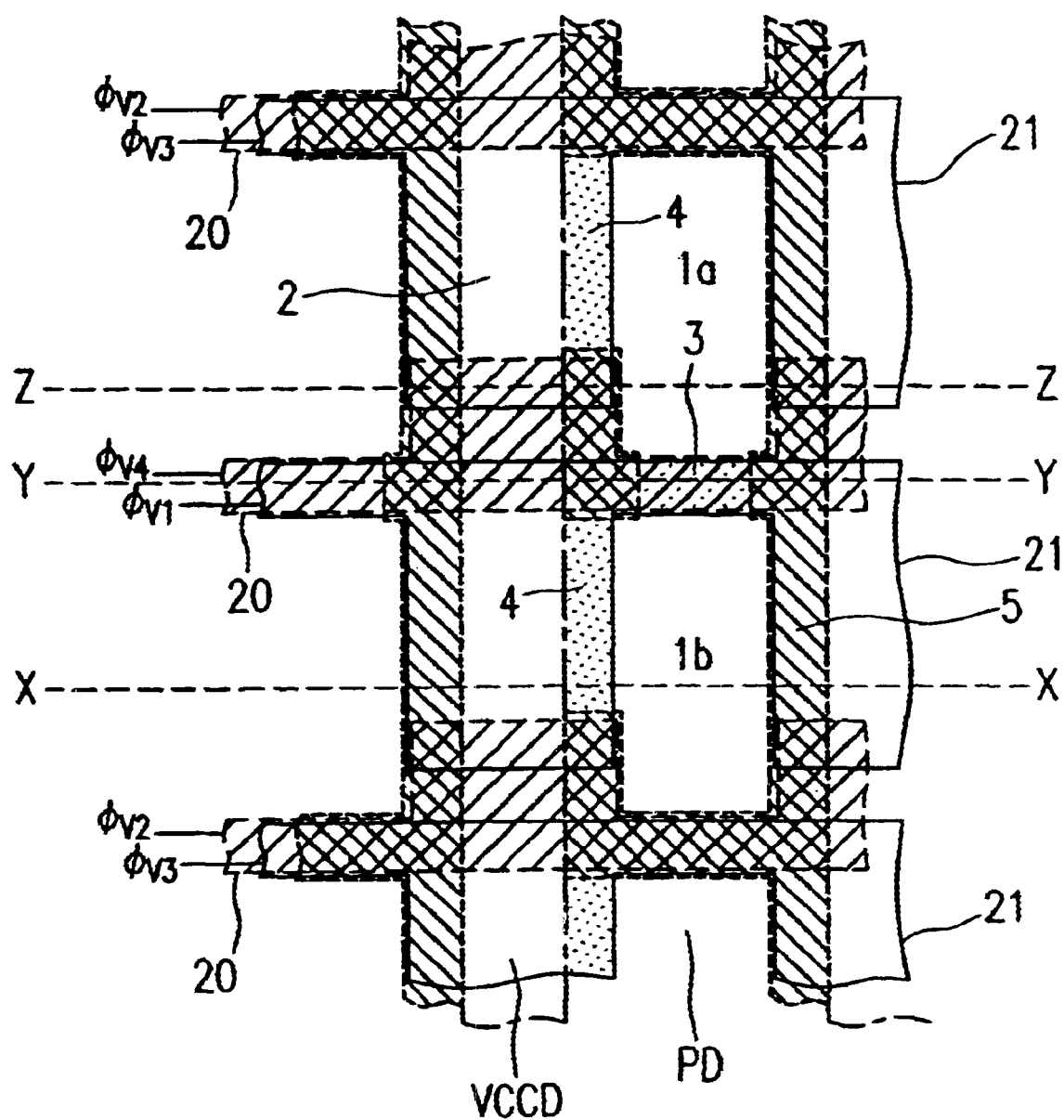
FIG. 2A is a detailed plan view illustrating the interline transfer type solid imaging device according to the present invention.

Hereinafter, an example of the present invention will be described with reference to the accompanying drawings.

FIG. 1 is a schematic diagram illustrating two adjoining pixels 1a and 1b and a vertical transfer section 2 of an interline transfer type solid imaging device according to one example of the present invention. Specifically, FIG. 1 shows chronologically-occurring states ((a) to (f)) of the pixels 1a and 1b. The dots in FIG. 1 represent signal charges. A horizontal direction and a vertical direction are defined as illustrated in FIG. 1.

It is assumed that the pixel 1a constitutes a $(2n-1)^{th}$ (or "odd-numbered") photosensitive section and that the pixel 1b constitutes a $(2n)^{th}$ (or "even-numbered") photosensitive section, where n is a natural number. The information in the odd-numbered photosensitive section 1a and the even-numbered photosensitive section 1b together correspond to one bit in the vertical transfer section 2.

In FIG. 1, state (a) represents a state immediately after an optical shutter (not shown) has been shut following a period for obtaining sufficient exposure. It is assumed that the optical shutter remains shut throughout states (a) to (f).

In state (a), the photosensitive sections 1a and 1b store signal charges. Instate (b), the signal charges in the odd-numbered photosensitive section 1a are all read into the vertical transfer section 2. In state (c), a portion of the signal charges is shifted from the even-numbered photosensitive section 1b into the odd-numbered photosensitive section 1a.

In state (d), the signal charges which have been read into the vertical transfer section 2 are sequentially read to the outside, thereby providing a first field image signal corresponding to the odd-numbered photosensitive section 1a. In state (e), the signal charges (which were originally in the even-numbered photosensitive section 1b) in the odd-numbered photosensitive section 1a and the even-numbered photosensitive section 1b are all read into the vertical transfer section 2, where the signal charges are added.

Finally, in state (f), the signal charges which have been read into and added by the vertical transfer section 2 are sequentially read to the outside, thereby providing a second field image signal corresponding to the even-numbered photosensitive section 1b.

FIG. 2A is a detailed plan view illustrating the interline transfer type solid imaging device according to the present invention. FIG. 2B is a cross-sectional view illustrating the interline transfer type solid imaging device in FIG. 2A taken at line X—X. FIG. 2C is a cross-sectional view illustrating the interline transfer type solid imaging device in FIG. 2A taken at line Y—Y. FIG. 2D is a cross-sectional view illustrating the interline transfer type solid imaging device in FIG. 2A taken at line Z—Z.

In FIG. 2A, broken lines depict lower electrodes 20; solid lines depict upper electrodes 21; a hatched portion represents a channel interruption region 5; and a dotted portion represents a surface channel region 4. In FIG. 2A, the component elements which also appear in FIGS. 1 and 8A are denoted by the same reference numerals as used therein.

The photosensitive sections 1a and 1b are formed on a low-concentration P layer. In general, the photosensitive sections 1a and 1b (PD) are implemented by using an embedded photodiode structure, as shown in FIGS. 2B, 2C, 2D, and 8B. The surface of the photosensitive sections 1a and 1b is a surface potential stabilization layer (high-concentration $P^+$ layer) 13. The underlying one of the photosensitive sections 1a and 1b is a signal charge storage layer (N layer) 12 for storing signal charges (electrons). The signal charge storage layer 12 is formed on a potential barrier layer (low-concentration P layer) 11.

In general, the vertical transfer section 2 (VCCD) is implemented as an embedded channel composed essentially of an N surface layer overlying the low-concentration P layer. Clock signals $\phi_{v2}$ and $\phi_{v4}$ are applied to the lower electrodes 20. Clock signals $\phi_{v1}$ and $\phi_{v3}$ are applied to the upper electrodes 21.

Figure 6:
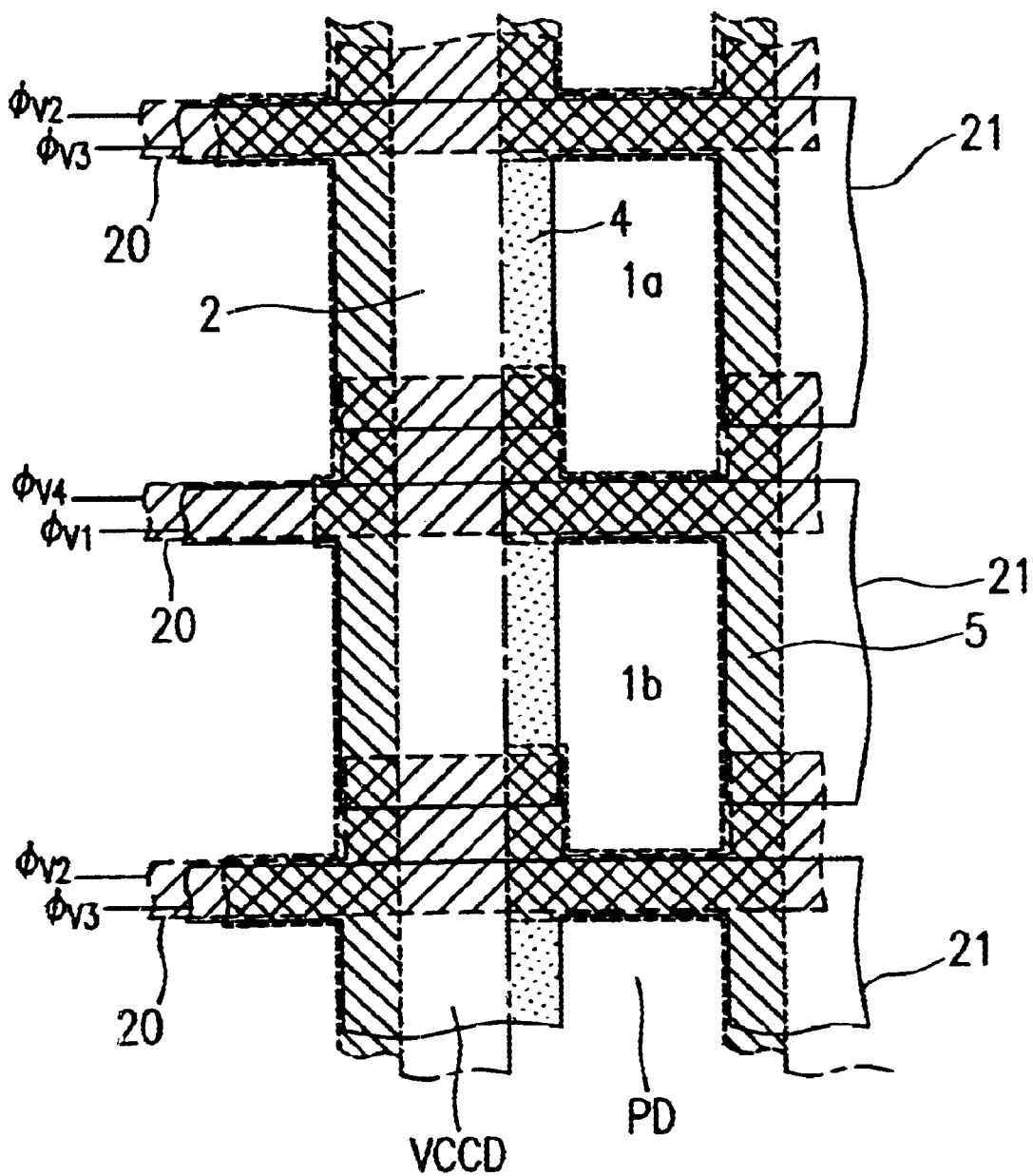
FIG. 6 illustrates a plane pattern implementing the conventional photosensitive sections 1a and 1b and the vertical transfer section 2 shown in FIG. 5.
Figure 7:
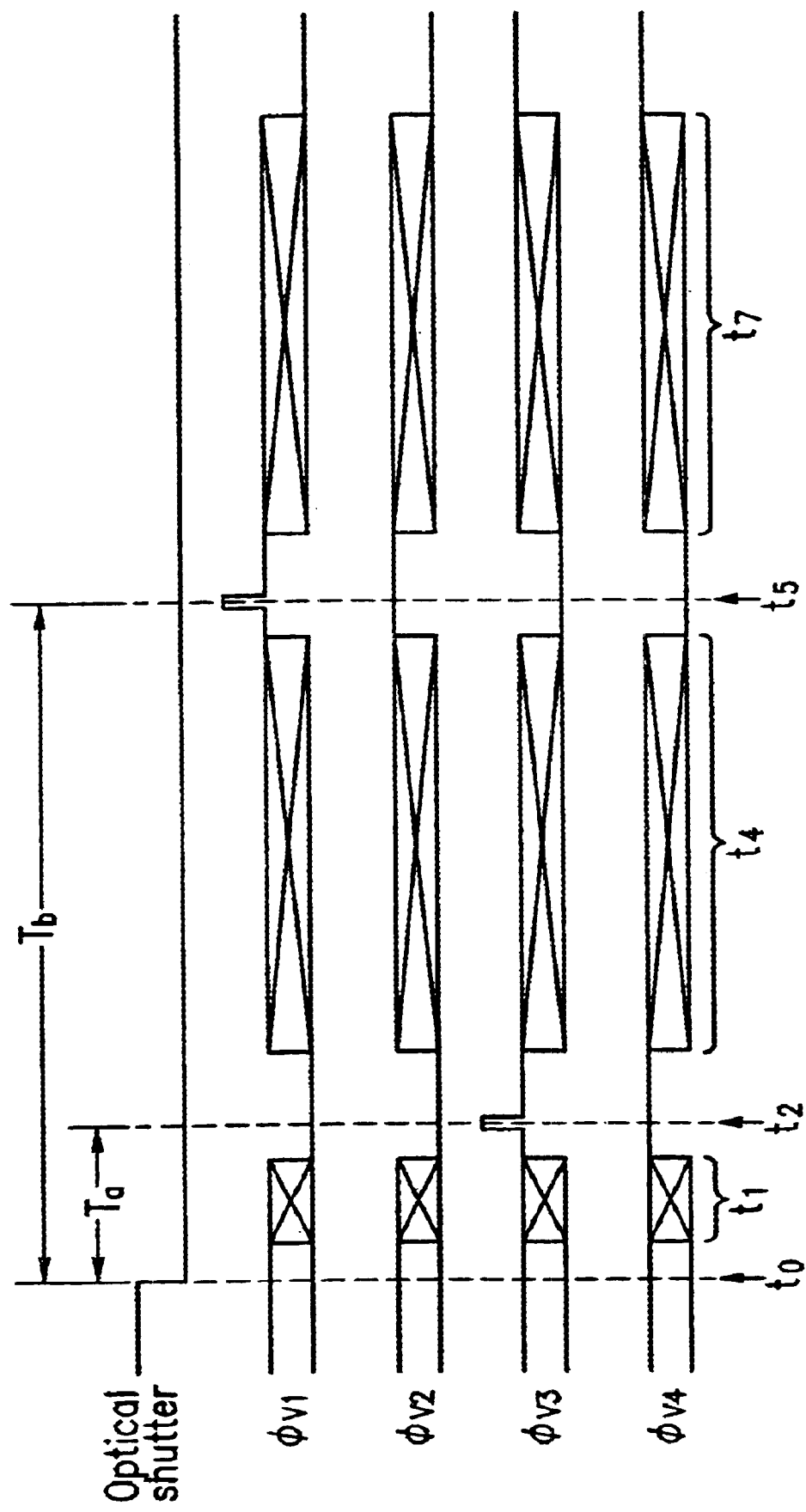
FIG. 7 illustrates an operation of the interline transfer type solid imaging device shown in FIG. 6.

The structure of the interline transfer type solid imaging device of the present invention illustrated in FIG. 2A differs from that of the conventional interline transfer type solid imaging device of FIG. 6 in that a surface channel region 3 (shown as a dotted region in FIG. 2A) is provided between the odd-numbered photosensitive section 1a and the even-numbered photosensitive section 1b so that signal charges can pass through the surface channel region 3.

As shown in FIGS. 2B and 2D, the photosensitive sections 1a and 1b each include the signal charge storage layer 12, the substrate 10, and the potential barrier layer 11 formed between the signal charge storage layer 12 and the substrate 10. Furthermore, the photosensitive sections 1a and 1b each include the high-concentration surface potential stabilization layer 13 formed upon the surface of the signal charge storage layer 12. The potential stabilization layer 13 has the opposite conductivity type from that of the signal charge storage layer 12.

As shown in FIG. 2A, the upper electrodes 21 are formed so as to cover the portion between the photosensitive section 1a and the vertical transfer section 2, the portion between the photosensitive section 1b and the vertical transfer section 2, as well as a portion of the vertical transfer section 2.

As shown in FIG. 2A, the lower electrodes 20 are formed so as to extend between the photosensitive sections 1a and 1b and over a portion of the vertical transfer section 2. The surface channel region 3 for transferring signal charges is formed so as to underlie the lower electrode 20 interposed between the photosensitive sections 1a and 1b. The surface channel regions 4 for transferring signal charges are formed so as to extend between the photosensitive section 1a and the vertical transfer section 2, and between the photosensitive section 1b and the vertical transfer section 2, under the upper electrodes 21.

Furthermore, as shown in FIG. 2A, the channel interruption layer 5 for preventing movement of signal charges is formed so as to extend between at least a portion of the photosensitive sections 1a and 1b and the vertical transfer section 2. In other words, the channel interruption layer 5 and the channel regions 3 and 4 surround the photosensitive sections 1a and 1b.

Although omitted from illustration in FIG. 2A, it will be appreciated that the photosensitive sections 1a and 1b are provided in a matrix so that a plurality of photosensitive sections 1a and 1b are present along the vertical direction and along the horizontal direction as defined in FIG. 1.

The interline transfer type solid imaging device of the present invention reads from the photosensitive section 1a an image signal corresponding to a first field and reads from the photosensitive section 1b an image signal corresponding to a second field.

The interline transfer type solid imaging device operates as follows:

(i) after effecting exposure for a predetermined period of time, a shutter is activated to shield light from entering first and second photosensitive sections;

(ii) first signal charges stored in the first photosensitive section are read into the vertical transfer section 2;

(iii) a portion of second signal charges stored in the second photosensitive section is shifted into the first photosensitive section;

(iv) the first signal charges in the vertical transfer section 2 are read during a transfer operation;

(v) the signal charges stored in the second photosensitive section and the signal charges stored in the first photosensitive section are read into the vertical transfer section 2, and added within the vertical transfer section 2 so that the second signal charges are reproduced; and (vi) the reproduced second signal charges are read during a transfer operation.

The shifting of a portion of the second signal charges from the second photosensitive section to the first photosensitive section can be achieved by applying a read signal to the corresponding lower electrode 20.

The reading of the signal charges from the photosensitive section 1a or 1b into the vertical transfer section 2 can be achieved by applying a read signal to the corresponding upper electrode 21.

Figure 3:
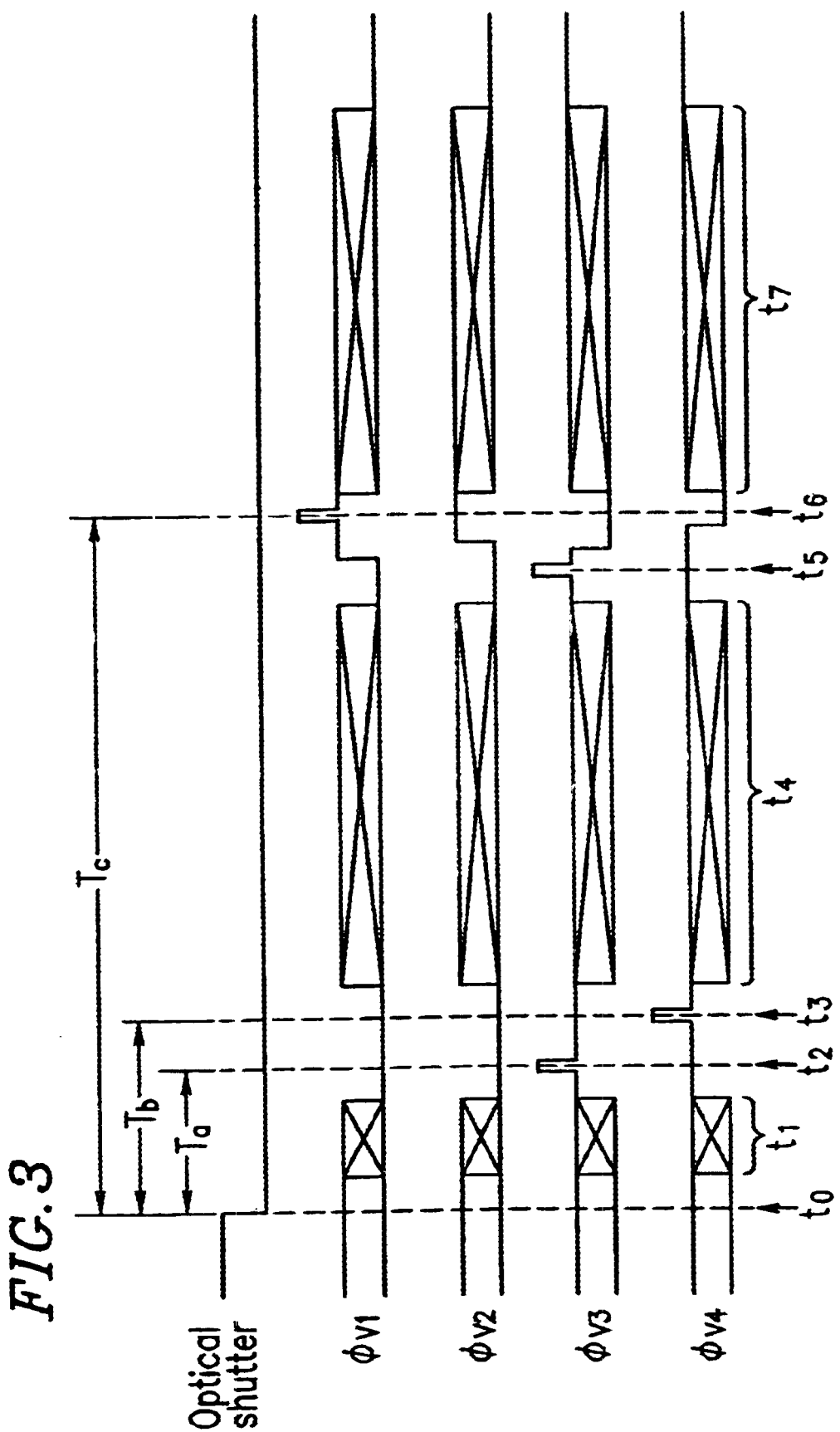
FIG. 3 is a detailed timing diagram illustrating the operation of the interline transfer type solid imaging device shown in FIG. 2.

FIG. 3 is a more detailed timing diagram illustrating the operation of the interline transfer type solid imaging device shown in FIGS. 2A to 2D.

At time $t_0$, an optical shutter (not shown) is shut after a period for obtaining sufficient exposure, corresponding to state (a) in FIG. 1.

During period $t_1$, the vertical transfer section 2 is driven at a high speed so as to drain unnecessary charges within the vertical transfer section 2. At time $t_2$, the signal charges in the odd-numbered photosensitive section 1a are read into the vertical transfer section 2, corresponding to state (b) in FIG. 1.

At time $t_3$ immediately after time $t_2$, about ½ of the signal charges in the even-numbered photosensitive section 1b are moved into the emptied odd-numbered photosensitive section 1a, corresponding to state (c) in FIG. 1.

Then, during period $t_4$, the vertical transfer section 2 is driven at a normal speed so that the signal charges within the vertical transfer section 2 are read to the outside to give a first field image signal corresponding to the odd-numbered photosensitive section 1a, corresponding to state (d) in FIG. 1.

Next, at time $t_5$, the signal charges in the odd-numbered photosensitive section 1a are read into the vertical transfer section 2, and the signal charges which have been read are subjected to a ½ bit transfer within the vertical transfer section 2. As used herein, a ½ bit transfer is defined as a movement of the signal charges within the vertical transfer section 2 which are located in the vicinity of the odd-numbered photosensitive section 1a toward the vicinity of the even-numbered photosensitive section 1b within the vertical transfer section 2.

After the ½ bit transfer has taken place, at time $t_6$, the signal charges in the even-numbered photosensitive section 1b are read into the vertical transfer section 2, and the signal charges in the even-numbered photosensitive section 1b and the odd-numbered photosensitive section 1a are added, whereby all of the signal charges which were originally in the even-numbered photosensitive section 1b are restored, corresponding to state (e) in FIG. 1.

Finally, during period $t_7$, the vertical transfer section 2 is driven at a normal speed so that the signal charges within the vertical transfer section 2 are read to the outside to give a second field image signal corresponding to the even-numbered photosensitive section 1b, corresponding to state (f) in FIG. 1.

Now, for the sake of illustration, it is assumed that an amount ($Q_{sat}$) of signal charges are stored in the signal charge storage layer 12 at time $t_0$ in FIG. 3 (i.e., immediately after the optical shutter has been shut). The amount $Q_{sat}$ defines the saturation level, or the upper limit, of the amount of signal charges which can be stored in the signal charge storage layer 12.

Since no signal charges are generated in the photosensitive sections 1a and 1b between time $t_0$ and the next time the shutter is opened, the saturation level $Q_{sat}$ of signal charges continuously decreases due to heat emission effects.

Figure 9:
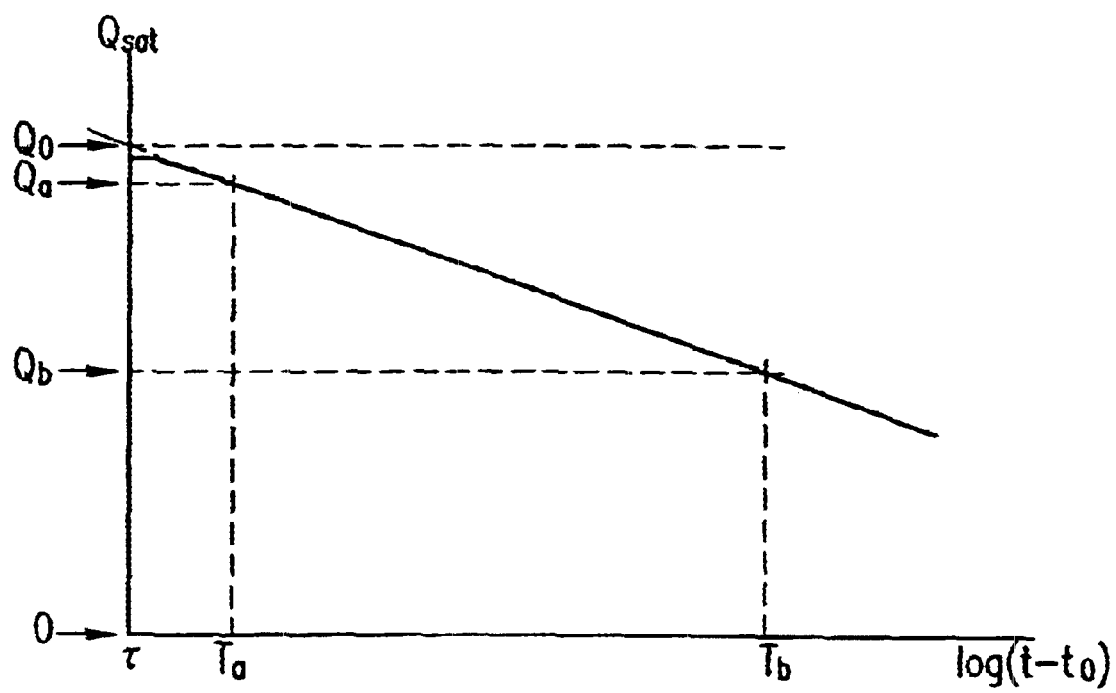
FIG. 9 is a graph depicting the relationship of eq. 1.

The amount of signal charges which can be stored in the odd-numbered photosensitive section 1a in the interline transfer type solid imaging device shown in FIG. 2 decreases as shown in the graph of FIG. 9.

However, after time $t_3$ (at which the signal charges are divided between the two photosensitive sections 1a and 1b), the amount of signal charges which can be stored in the even-numbered photosensitive section 1b in the interline transfer type solid imaging device shown in FIGS. 2A to 2D would appear to equal about twice as much as that of the conventional even-numbered photosensitive section 1b.

Figure 4:
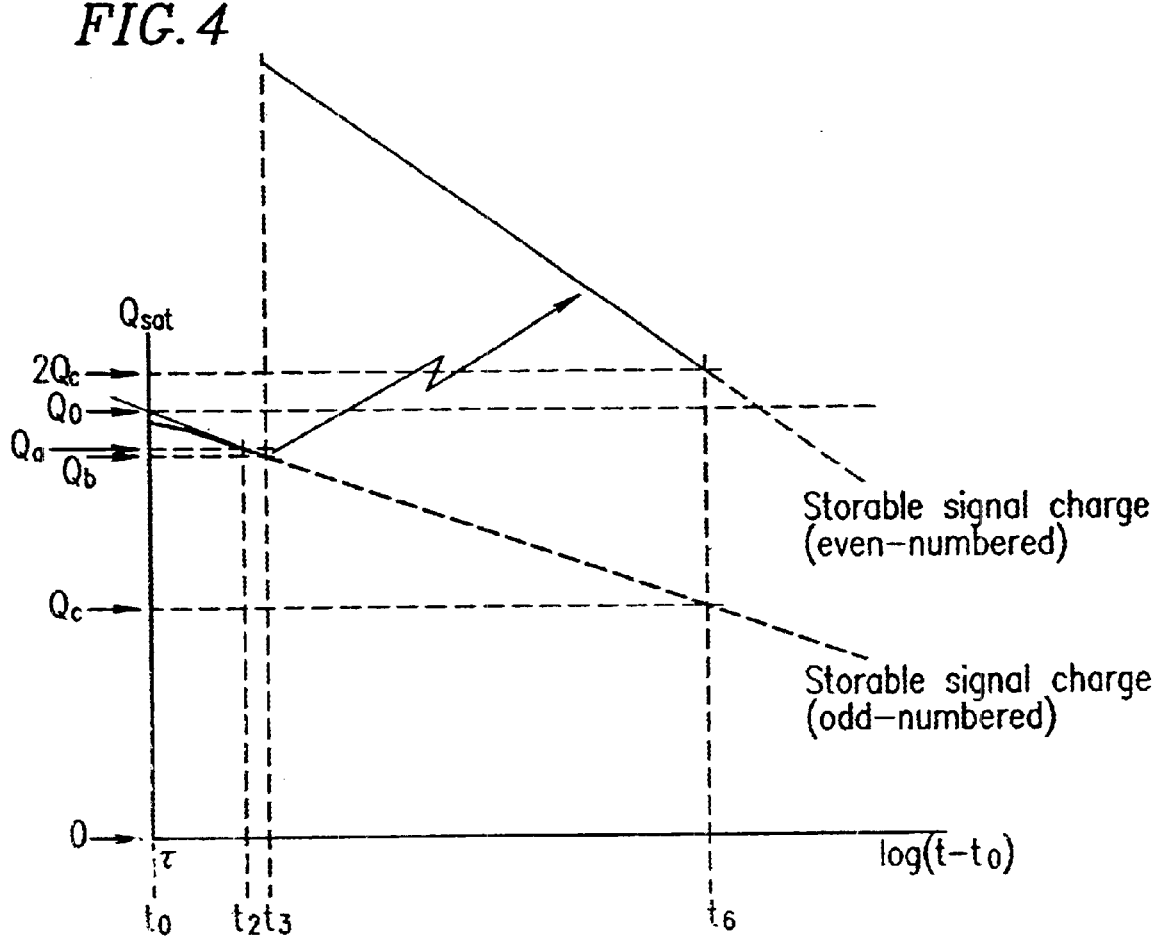
FIG. 4 is a graph illustrating the relationship between lapse of time and the amount of signal charges which can be stored in the odd-numbered photosensitive section 1a (thicker line) or in the even-numbered photosensitive section 1b (thinner line).
Figure 5:
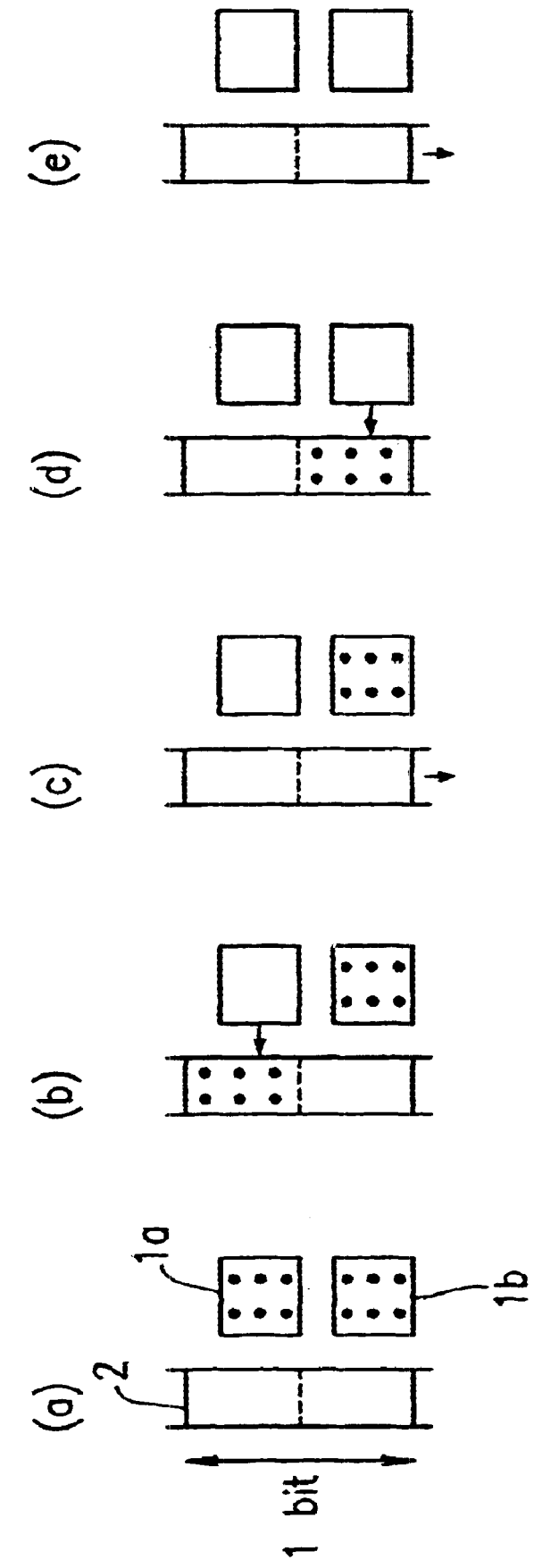
FIG. 5 is a schematic diagram illustrating two adjoining pixels 1a and 1b and a vertical transfer section 2 of a conventional interline transfer type solid imaging device, illustrating chronologically-occurring states ((a) to (e)) of the pixels 1a and 1b.

FIG. 4 is a graph illustrating the relationship between lapse of time and the amount of signal charges which can be stored in the odd-numbered photosensitive section 1a (thicker line) or in the even-numbered photosensitive section 1b (thinner line).

In accordance with the timing scheme illustrated in FIG. 3, the $Q_{sat}$ level of the first field corresponding to the odd-numbered photosensitive section 1a is shown at $Q_a$ in the graph of FIG. 4 (as calculated by substituting $t_2-t_0=T_a$ in eq. 1).

On the other hand, the $Q_{sat}$ level of the second field corresponding to the even-numbered photosensitive section 1b is bottlenecked by whichever is the smaller between: $Q_b$ as calculated by substituting $t_3-t_0=T_b$ in eq. 1; and $2Q_c$ as calculated by substituting $t_6-t_{0=Tc}$ in eq. 1. Stated otherwise, if an amount $Q_b$ of signal charges are divided at time $t_3$, then the signal charge amount after division cannot be larger than $Q_b$; on the other hand, if $2Q_c$ is smaller than $Q_b$, then $2Q_c$ defines the maximum storage capacity.

As described earlier with reference to eq. 1 and eq. 2, $Q(t)/Q_0$ generally equals about 0 to about 0.3. Therefore, even if $T_c>T_a\approx T_b$, the relationship $2Q_c>Q_b\approx Q_a$ still holds. Thus, the saturation level of the even-numbered photosensitive section 1b is effectively increased relative to that of the odd-numbered photosensitive section 1a, thereby preventing the decrease in the saturation level as associated with the conventional technique.

In accordance with the present invention, signal charges which are first stored in the photosensitive section 1b are divided between the two photosensitive sections 1a and 1b. Although the storable amount of signal charges may decrease over time, the storable amount of signal charges at a given point in time will be large enough to accommodate each divided portion of signal charges. Therefore, the amount of signal charges which are stored in the even-numbered photosensitive section 1b will not decrease after division of the signal charges.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An interline transfer type solid imaging device comprising a first photosensitive section, a second photosensitive section, and a vertical transfer section, the interline transfer type solid imaging device reading an image signal corresponding to a first field from the first photosensitive section and reading an image signal corresponding to a second field from the second photosensitive section, wherein the interline transfer type solid imaging device operates as follows:

(i) after effecting exposure for a predetermined period of time, light is shielded from entering the first and second photosensitive sections;

(ii) first signal charges stored in the first photosensitive section are read into the vertical transfer section;

(iii) a portion of second signal charges stored in the second photosensitive section are shifted into the first photosensitive section;

(iv) the first signal charges in the vertical transfer section are read during a transfer operation;

(v) the signal charges stored in the second photosensitive section and the signal charges stored in the first photosensitive section are read into the vertical transfer section, and added within the vertical transfer section so that the second signal charges are reproduced; and (vi) the reproduced second signal charges are read during a transfer operation.

2. An interline transfer type solid imaging device according to claim 1, wherein a channel for transferring signal charges is provided between the second photosensitive section and the first photosensitive section.

3. An interline transfer type solid imaging device according to claim 1, wherein the first photosensitive section and the second photosensitive section each comprise a signal charge storage layer, a substrate, and a potential barrier layer formed between the signal charge storage layer and the substrate, and wherein the first photosensitive section and the second photosensitive section each have a vertical overflow drain structure for draining excessive signal charges stored in the signal charge storage layer to the substrate.

4. An interline transfer type solid imaging device according to claim 3, wherein the first photosensitive section and the second photosensitive section each include a high-concentration surface potential stabilization layer upon the signal charge storage layer, the potential stabilization layer having the opposite conductivity type from that of the signal charge storage layer.

5. An interline transfer type solid imaging device according to claim 1, further comprising:

a lower electrode layer formed so as to extend between the first photosensitive section and the second photosensitive section;

a channel region underlying the lower electrode layer for transferring signal charges between the first photosensitive section and the second photosensitive section; and a channel interruption layer formed so as to extend between at least a portion of the first and second photosensitive sections and the vertical transfer section, wherein a portion of the lower electrode layer covers a portion of the vertical transfer section.

6. An interline transfer type solid imaging device according to claim 5, wherein the shifting of the portion of the second signal charges from the second photosensitive section to the first photosensitive section is achieved by applying a read signal to the lower electrode layer.

7. An interline transfer type solid imaging device according to claim 5, further comprising:

an upper electrode layer formed so as to cover a portion between the first photosensitive section and the vertical transfer section, the portion between the second photosensitive section and the vertical transfer section, as well as a portion of the vertical transfer section, a channel region formed so as to extend between the first and second photosensitive sections and the vertical transfer section, under the upper electrode layer, a further vertical transfer section formed in a vicinity of the first and second photosensitive sections, and a further channel interruption layer formed between the further vertical transfer section and the first and second photosensitive sections.

8. An interline transfer type solid imaging device according to claim 7, wherein the reading of the signal charges from the first and second photosensitive sections into the vertical transfer section is achieved by applying a read signal to the upper electrode layer.

* * * * *